United States Patent [19]

Humphrey

[11] Patent Number: 5,114,586
[45] Date of Patent: May 19, 1992

[54] SANITATION SYSTEM

[76] Inventor: Frank Humphrey, P.O. Box 4176, Carlsbad, Calif. 92008

[21] Appl. No.: 561,416

[22] Filed: Aug. 1, 1990

[51] Int. Cl.$^5$ .............................................. C02F 3/02
[52] U.S. Cl. ...................... 210/606; 210/608; 210/620; 210/104; 210/138; 210/202; 210/220; 210/259; 210/919
[58] Field of Search ............... 210/606, 607, 608, 620, 210/632, 919, 104, 109, 138, 220, 201, 202, 253, 257.1, 258, 259

[56] References Cited

U.S. PATENT DOCUMENTS

| | | | |
|---|---|---|---|
| 3,306,447 | 2/1967 | Medeiros | 210/202 |
| 3,318,449 | 5/1967 | Jennings et al. | 210/104 |
| 3,543,294 | 11/1970 | Boester | 210/620 |
| 3,666,106 | 5/1972 | Green | 210/608 |
| 3,810,544 | 5/1974 | Armstrong et al. | 210/167 |
| 3,815,159 | 6/1974 | Delaney et al. | 210/195 |
| 3,834,536 | 9/1974 | Kelsey | 210/220 |
| 3,870,634 | 3/1975 | Humphrey | 210/220 |
| 3,923,656 | 12/1975 | Krebs et al. | 210/220 |
| 3,927,425 | 12/1975 | Delaney et al. | 210/195 |
| 4,008,159 | 2/1977 | Besik | 210/201 |
| 4,017,395 | 4/1977 | Davis | 210/167 |
| 4,168,228 | 9/1979 | Mallatt et al. | 210/631 |
| 4,172,034 | 10/1979 | Carlsson et al. | 210/620 |
| 4,228,006 | 10/1980 | Hanna | 210/167 |
| 4,465,594 | 8/1984 | Laak | 210/919 |
| 4,501,665 | 2/1985 | Wilhelmson | 210/151 |
| 4,810,386 | 3/1989 | Copa et al. | 210/631 |
| 4,812,237 | 3/1989 | Cawley et al. | 210/605 |
| 4,940,539 | 7/1990 | Weber | 210/608 |

Primary Examiner—Stanley S. Silverman
Assistant Examiner—Christopher Upton
Attorney, Agent, or Firm—Dunlap Codding & Lee

[57] ABSTRACT

A sanitation system for treating a black water stream and a grey water stream. The black water stream is inputted into a black water digester wherein the black water stream is aerobically digested to produce a treated black water stream and the treated black water stream is discharged from the black water digester. The treated black water stream is inputted into a black and grey water digester and the grey water stream also is inputted into the black and grey water digester. The treated black water stream and the grey water stream are aerobically digested in the black and grey water digester to produce a treated black and grey water stream and the treated black and grey water stream is outputted from the black and grey water digester.

19 Claims, 5 Drawing Sheets

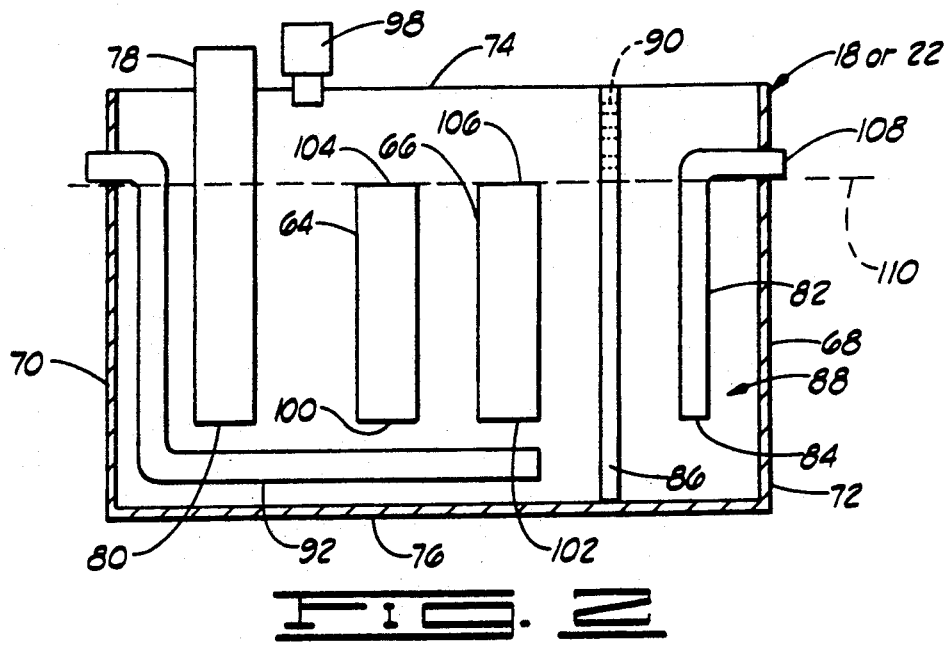
FIG. 2
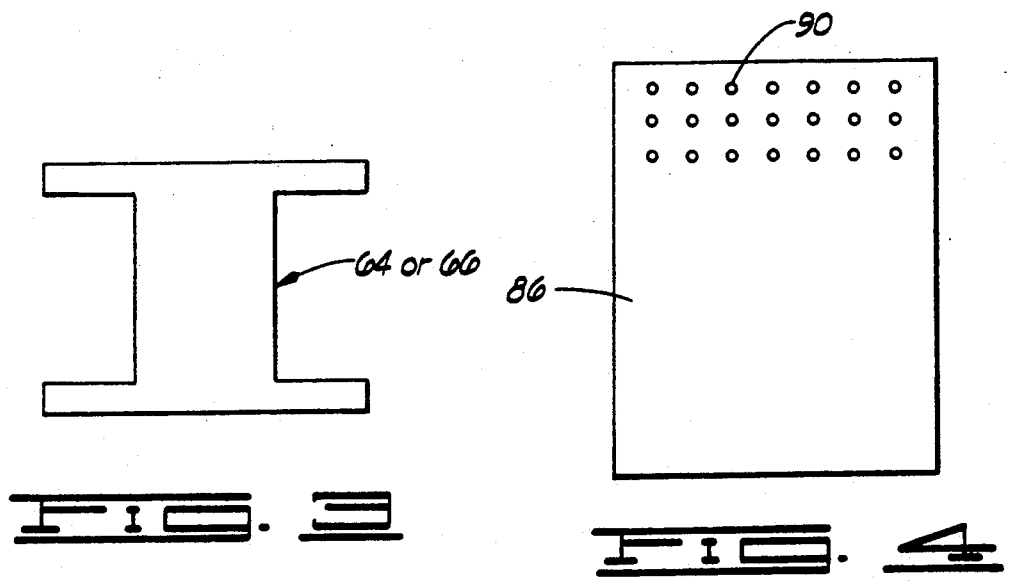
FIG. 3
FIG. 4
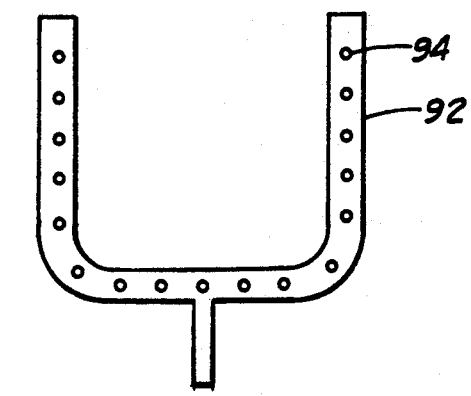
FIG. 5

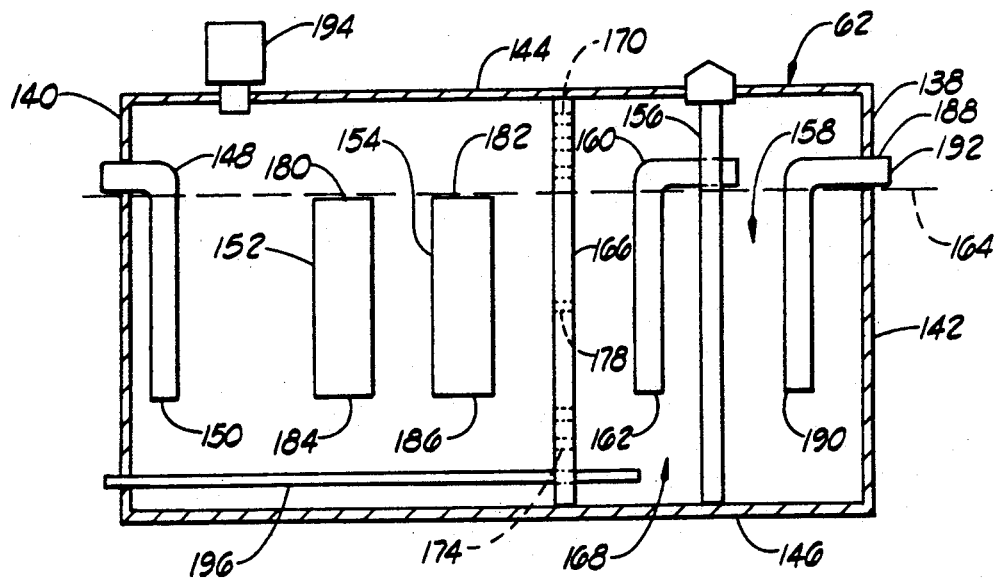
FIG. 6
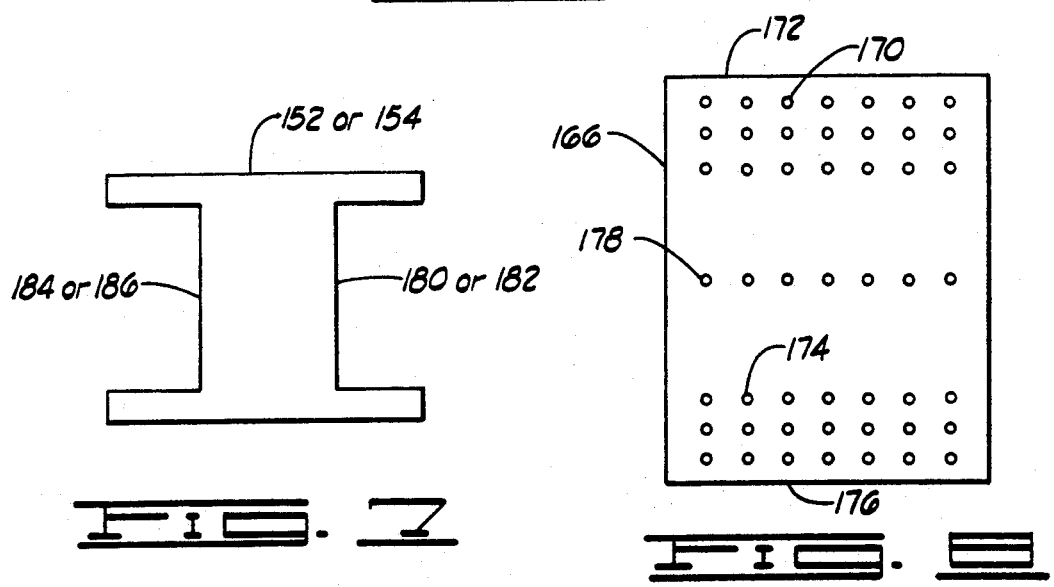
FIG. 7
FIG. 8
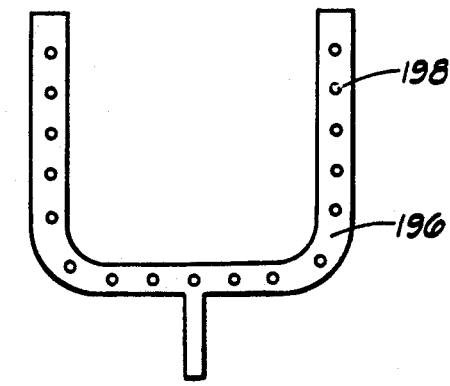
FIG. 9

5,114,586

SANITATION SYSTEM

FIELD OF THE INVENTION

The present invention relates generally to sanitation systems and, more particularly, but not by way of limitation, to a sanitation system wherein a black water stream first is past through a black water treatment digester to produce a treated black water stream and the treated black water stream and a grey water stream then are passed into and through a combined digester. The present invention also relates to a system for removing grease from a grey water stream such as produced from a kitchen sink.

BRIEF DESCRIPTION OF THE DRAWINGS

FIG. 2 is a sectional, partial elevational, partial schematic view of a typical black water treatment digester.

FIG. 3 is a plan view of a typical baffle used in the black water treatment digester of FIG. 2.

FIG. 4 is a plan view of a typical filter plate used in the black water treatment digester of FIG. 2.

FIG. 5 is a plan view of an air tube used in the black water treatment digester of FIG. 2.

FIG. 6 is a sectional, partial elevational, partial schematic view of a grey water digester.

FIG. 7 is a plan view of a typical baffle used in the grey water digester of FIG. 6.

FIG. 8 is a plan view of a filter plate used in the grey water digester of FIG. 6.

FIG. 9 is a plan view of an air tube used in the grey water digester of FIG. 6.

DESCRIPTION OF THE PREFERRED EMBODIMENTS

Figure 1:
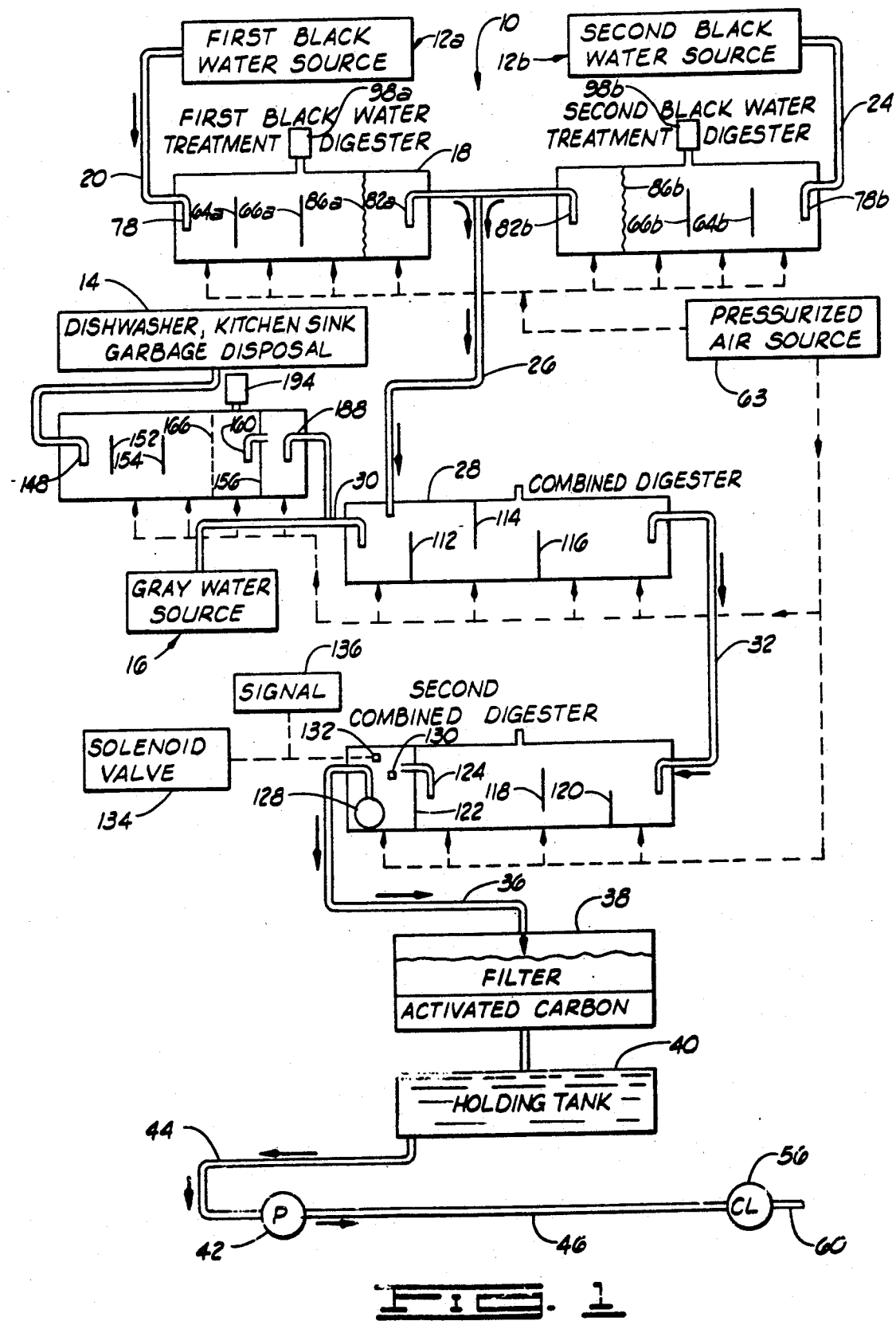
FIG. 1 is a schematic view of a sanitation system constructed in accordance with the present invention.

Shown in FIG. 1 is a sanitation system constructed in accordance with the present invention and designated therein by the general reference numeral 10. The sanitation system 10 is adapted to treat black water streams discharged from toilets and two toilets are shown in the drawing designated by the reference numerals 12a and 12b. In the drawing, the toilets are designated and sometimes referred to herein as "first black water source" and "second black water source" or simply as "black water source". The sanitation system 10 is adapted to be used with a plurality of toilets and the two toilets or black water sources 12a and 12b are shown in the drawing for illustration purposes.

Sanitation system 10 also is adapted to treat grey water. As shown in FIG. 1, there is a first grey water source 14 which represents grey water discharged from a dishwasher, kitchen sink and/or garbage disposal for example and a second grey water source 16 which represents water discharged from a shower, lavatory or in some instances a kitchen sink. The first grey water source 14 is distinguished from the second water source 16 in that the first grey water source 14 generally discharges grey water having food refuse (solids) and grease therein whereas such contaminants are generally not contained in the second grey water source 16.

In the sanitation system 10, each toilet 12 is connected to a black water treatment digester. More particularly, the first toilet 12a is connected to a first black water treatment digester 18 via a conduit 20, and the second toilet 12b is connected to a second black water treatment digester 22 via a conduit 24.

When the first toilet 12a is flushed, a black water stream is discharged through the conduit 20 and passed into the first black water treatment digester 18. When the second toilet 12b is flushed, a black water stream is discharged through the conduit 24 and passed into the second black water treatment digester The black water treatment digesters 18 and 20 each receive the black water stream from the toilets 12a and 12b via the conduits 20 and 24, respectively. The black water treatment digesters 18 and 22 are identical in construction and each of the black water treatment digesters 18 and 22 is constructed to remove a substantial portion of the solids from the black water streams and to primarily treat the solids removed from the black water streams via aerobic digestion to produce a treated black water stream.

The treated black water stream is passed from the black water treatment digesters 18 and 22 through a conduit 26 which is connected to a combined digester 28. The treated black water stream is passed into and through the combined digester 28.

The first and the second grey water sources 14 and 16 each produce a grey water stream and the grey water stream from each of the grey water sources 14 and 16 is passed through a conduit 30 and into the combined digester 28. The combined digester 28 is constructed and adapted to remove a substantial portion of the solids from the received grey water stream and the received treated black water stream. The solids removed from grey water stream and the treated black water stream are aerobically digested in the combined digester 28 to produce a treated combined black and grey water stream.

The treated combined black and grey water stream is passed from the combined digester 28 via a conduit 32 into a second combined digester 34. The second combined digester 34 functions to further remove solids from the treated combined black and grey water stream and to aerobically digest the solids removed from treated combined black and grey water stream to produce a treated output stream which is outputted from the second combined digester 34 through a conduit 36.

The treated output stream is passed through the conduit 36 and through a filter 38. The filter 38 contains activated carbon and the treated output stream is passed through the activated carbon for further filtering and treating of the treated output stream. The treated output stream is passed through the filter 38 and into a holding tank 40. The treated output stream is stored or retained in the holding tank 40.

A pump 42 is connected to the holding tank 40 via a conduit 44. The pump has an ON condition and an OFF condition. In the ON condition of the pump 42, the pump 42 functions to pump the treated output stream from the holding tank 40 and pas the treated output stream through a conduit 46 into and through a chlorinator 56. The chlorinator 56 contains chlorine pellets and functions to chlorinate the treated output stream. The treated output stream is outputted from the sanitation system 10 via a conduit 60 as an outputted reconditioned water stream.

In some applications, the filter 38 can be eliminated and the treated output stream can be passed directly from the second combined digester 34 into the holding tank 40. Further, the chlorinator 56 can be located at any position before the discharge of the outputted recondition water stream such as between the filter 38 and the holding tank 40 for example. In some applications, the treated output stream outputted from the second combined digester 34 can be outputted as the outputted reconditioned water stream.

In most applications, it is not desirable to continuously discharge the treated output stream. For this reason, the holding tank 40 is provided with means which, along with the pump 42, provides a means for discharging the treated output stream at periodic time intervals such as three times per day for example.

The first grey water source 14 produces a grey water stream having solids and sometimes grease combined therein. A grey water digester 62 is interposed between the combined digester 28 and the first grey water source 14. The grey water digester 62 functions to remove a substantial portion of solids from the grey water stream outputted from the first grey water source 14 and to remove grease from the grey water stream outputted from the first grey water source 14. The grey water digester 62 in essence functions in the nature of a grease trap. The grey water outputted from the grey water digester 62 is connected to the grey water outputted in the second grey water source 16 and the combined grey water streams are outputted or passed through the conduit 30 into the combined digester 28. It has been found that using the grey water digester 62 greatly improves the efficiency of the sanitation system 10.

The digesters 18, 22, 28, 34 and 62 each aerobically treat or digest the material disposed therein. The sanitation system 10 includes a pressurized air source 63 constructed to output air at a predetermined elevated pressure level. The air outputted by the pressurized air source 63 is inputted into each of the digesters 18, 22, 28, 34 and 62, as indicated by the dashed-lines with arrows in the drawing, to facilitate the aerobic digestion of the material disposed in the respective digesters 18, 22, 28, 34 and 62. A vent also is formed on each of the digesters 18, 22, 28, 34 and 62 for venting gases generated in the respective digesters 18, 22, 28, 34 and 62.

The first and the second black water treatment digesters 18 and 22 are identical in construction and operation. A typical black water treatment digester 18 or 22 is shown in FIGS. 2-5.

The black water treatment digesters 18 and 22 each include a pair of baffles 64 and 66. The baffles in the first black water treatment digester 18 are designated by the reference numerals 64a and 66a and the baffles in the second black water treatment digester 22 are designated by the reference numerals 64b and 66b in FIG. 1.

The baffles 64 and 66 each extend across a central portion of the black water treatment digesters 18 and 22 so that the solids tend to either float to the top or sink or settle to the bottom of the respective black water treatment digesters 18 and 22 as the black water streams pass through the respective black water treatment digesters 18 and 22.

Each of the black water treatment digesters 18 and 22 comprises a tank 68 having an inlet end 70, an outlet end 72, an upper end 74 and a lower end 76.

An inlet pipe 78 is disposed through the upper end 74 of the tank 68 and the inlet pipe 78 extends a distance through the tank 68 terminating with a lower end 80. The lower end 80 of the inlet pipe 78 is disposed near and spaced a distance above the lower end 76 of the tank 68. The inlet pipes are designated by the respective reference numerals 78a and 78b with respect to the respective black water treatment digesters 18 and 22 in FIG. 1.

The tank 68 also includes an outlet pipe 82 which extends through the outlet end 72 of the tank 68. The outlet tank 82 extends a distance downwardly through the tank 68 terminating with a lower end 84 which is disposed generally above and spaced a distance generally above the lower end 76 of the tank 68. The lower end 84 of the outlet pipe 82 is disposed in a plane generally coplanar with the lower end 80 of the inlet pipe 78. The outlet pipes in the digesters 18 and 22 are designated by the respective reference numerals 82a and 82b in FIG. 1.

Disposed generally near and spaced a distance from the outlet end 72 of the tank 68 is a filter plate 86. The respective filter plates are designated in FIG. 1 by the reference numerals 86a and 86b.

The filter plate 86 is a solid plate extending generally across the tank 68 and isolating the inlet end of the tank 68 from the outlet end of the tank 68 thereby forming a discharge compartment 88 in the tank 68, generally near the outlet end 72 of the tank 68. The filter plate 86 has a series of openings 90 formed through an upper portion thereof and spaced a distance from the upper end 74 of the tank 68. The openings 90 extend from about the upper end of the baffles 64 and 66 to the upper end 74 of the tank 68.

An U-shaped air tube 92 is disposed in the lower end 76 portion of the tank 68. The air tube 92 has a plurality of openings 94 disposed therein (only one of the openings 94 being designated with the reference numeral in FIG. 5).

A vent 96 is formed in the upper end 74 of the tank 68.

A dispenser 98 is connected to the upper end 74 of the tank 68. The respective dispensers 98 are designated in FIG. 1 by the reference numerals 98a and 98b. The dispensers 98 each are adapted to retain a predetermined amount of a biological activator. The dispensers 98 each are adapted to dispense a predetermined amount of the biological activator into the respective black water treatment digesters 18 and 22. The dispensers 98 each are disposed generally near the inlet end 70 of the tanks 68 for dispensing the biological activator into the black water stream generally near the position where the black water stream enters the tank 68.

In one embodiment, the particular biological activator is a commercially available biological activator sold by Humphrey Marine Sewage Treatment Systems, Inc. of California as Activator No. 9. This activator is a culture which creates bacteria to enhance the digestion of the solids in the black water stream passed into and through the digesters 18 and 22.

It should be noted that the dispenser 98 could be used only on one of the digesters 18 or 22 or the dispenser 98 could be used in conjunction with the combined digester 28.

In operation, the black water enters the tank 68 via the inlet pipe 78. The lower end 76 of the inlet pipe 78 is disposed near the lower end 76 of the tank 68 to reduce turbulence and to reduce the amount of solids entering the central portion of the black water disposed in the tank 68.

Lower ends 100 and 102 of the respective baffles 64 and 66 are disposed in a horizontal plane about coplanar with the lower ends 80 and 84 of the respective inlet and outlet pipes 78 and 82 for tending to move solids in the black water to a position in the tanks 68 generally below the lower ends 80 and 84 of the inlet and outlet pipes 78 and 82, respectively. Upper ends 104 and 106 of the respective baffles 64 and 66 are disposed in a plane about coplanar with an exit end 108 of the outlet pipe 82. More particularly, the upper ends 104 and 106 of the respective baffles 64 and 66 are disposed in a plane about coplanar with an overflow line 110 of the outlet pipe 82.

The black water streams in the digesters 18 and 22 move generally from the inlet end 70 to the outlet end 72. The baffles 64 and 66 tend to force the solids to move either to the top of the water level within the tank 68 or to the bottom to the tank 68 as the black water moves through the tank 68 generally from the inlet end 70 to the outlet end 72.

The openings 90 and the filter plates 86 are disposed generally above the upper ends 104 and 106 of the baffles 64 and 66. The black water from the upper end portion of the black water in the tanks 68 passes through the openings 90 and the openings 90 function to filter many of the solids from the black water passing through the openings 94 and into the discharge compartment 88.

As the black water passes into the discharge compartment 88, the black water in the discharge compartment 88 continues to fill the discharge compartment 88 until the black water in the discharge compartment 88 is at a level generally at or slightly above the overflow line 110 and, the black water in the discharge compartment 88 then overflows and is discharged through the outlet pipe 82 to discharge the treated black water from the tank 68. The lower end 84 of the outlet pipe 82 is positioned in the discharge compartment 88 to primarily receive black water in the discharge compartment 88 at a central or mid-position with respect to the lower end 76 of the tank 68 and the upper level of the black water within the discharge compartment 88 thereby tending to reduce the amount of solids discharged through the outlet pipe 82 as the treated black water stream.

As shown in FIG. 1, the combined digester 28 includes a series of baffles (three baffles being shown in FIG. 1 and designated therein by the reference numerals 112, 114 and 116). The baffles 112, 114 and 116 are arranged to provide a tortious path through which the treated black water stream and the grey water stream pass as the treated black water stream and grey water stream pass through the combined digester 28. The baffles 112, 114 and 116 also tend to make the solids float or sink or settle to the bottom of the combined digester 28 for reducing the solids outputted from the combined digester 28 and for facilitating the aerobic digestion of the solids in the combined digester 28.

As shown in FIG. 1, the second combined digester 34 also contains baffles 118 and 120 and a end plate 122. As the treated combined black and grey water stream is passed through the second combined digester 34, the baffles 118 and 120 tend to force the solids to either float or sink or settle to the bottom for facilitating the digestion of solids in the second combined digester 34.

The end plate 122 includes an overflow pipe 124. The overflow pipe is positioned to receive liquid in the second combined digester 34 at a level or position generally midway between the lower end of the second combined digester 34 and the upper liquid level in the second combined digester 34. In other words, the overflow pipe 124 is positioned in the second combined digester 34 to receive liquid at about a central position of the liquid in the second combined digester 34 and to pass this liquid into a discharge chamber 126. By taking the liquid in the second combined digester 34 at a position generally midway between the upper and lower levels of the liquid in the second combined digester 34 this reduces the amount of solids in the liquid pass from the second combined digester 34 into the discharge compartment since the solids tend to be moved to either the upper or the lower levels in the second combined digester 34. The discharge chamber 126 contains the liquid comprising the treated output stream.

As shown in FIG. 1, a pump 128 is disposed in the discharge chamber 126 of the second combined digester 34. The pump 128 is connected to a power source (not shown). A liquid level switch 130 is interposed in the discharge chamber 126. The switch 130 is interposed between the pump and the power source (not shown). The switch 130 is adapted to sense a predetermined high and a predetermined low liquid level within the discharge chamber 126.

In operation, when the liquid level in the discharge chamber 126 reaches a predetermined high level, the switch 130 is closed thereby energizing the pump 128 and causing the pump 128 to pump liquid from the discharge chamber 126. The pump 128 continues to pump liquid from the discharge chamber 126 until the liquid in the discharge chamber 126 reaches a predetermined low level. When the liquid in the discharge chamber 126 reaches the predetermined low level, the switch 130 is opened thereby disconnecting the pump 128 from the power source (not shown) and terminating the pumping of liquid from the discharge chamber 126. An alarm switch 132 also is disposed in the discharge chamber 126. The alarm switch 132 is adapted to sense a predetermined alarm high level of liquid in the discharge chamber 126. In response to sensing the predetermined alarm high level of liquid in the discharge chamber 126, the alarm switch 132 is closed thereby closing a solenoid valve 134. The valve 134 is connected to the water meter source of supply and is positioned and adapted to shut-off the main water supply to the house in response to the alarm switch 132 sensing the predetermined alarm high level of liquid in the discharge chamber 126 indicating a malfunction in the sanitation system 10.

As indicated in FIG. 1, the closing of the alarm switch 132 also causes a signal 136 to be activated thereby providing a visual or audible output indication of a malfunction. The signal 136 may be an alarm providing an audible output indication or a flashing light providing a visually perceivable output indication indicating a malfunction in the sanitation system 10.

As shown more clearly in FIGS. 6, 7, 8 and 9, the grey water digester 62 more particularly comprises a tank 138 having an inlet end and an outlet end 142. The tank 138 also has an upper end 144 and a lower end 146. An inlet pipe 148 is disposed through the inlet end 140 of the tank 138 and the inlet pipe extends a distance through the tank from the upper end 144 toward the lower end 146 terminating with a lower end 150. The lower end 150 of the inlet pipe 148 is disposed generally near and spaced a distance generally above the lower end 146 of the tank 138.

A pair of baffles 152 and 154 are interposed in the tank 138. A plate 156 is connected to the tank 138 generally between the baffles 152 and 154 and the outlet end 138 of the tank 142 thereby forming a discharge reservoir 158 generally between the plate 156 and the outlet end 142 of the tank 138. A plate pipe 160 extends through the plate 156. The plate pipe 160 has an inlet end 162 disposed in the tank 138 between the baffles 152 and 154 and the inlet end 140 of the tank 138. The inlet end 162 is disposed generally near and spaced a distance above the lower end 146 of the tank 138. The inlet end 162 is disposed to receive fluid from the tank at a position generally between the lower end 146 and the upper level of fluid in the tank 138 and between the plate 156 and the inlet end 146 of the tank 138, the inlet end 162 receiving fluid from about a central portion of the fluid within the tank 138. The fluid received by the inlet end 162 is passed through the plate pipe 160 and into the discharge reservoir 158 when the fluid level about the pipe reaches or exceeds an overflow level 164.

A filter plate 166 is connected to the tank 138 and disposed between the baffles 152 and 154 and the plate 156 thereby forming an initial reservoir 168 generally between the filter plate 166 and the plate 156. The inlet end 162 of the plate pipe 160 more particularly is disposed in the initial reservoir 168.

The filter plate 166 contains a series of upper openings 170 disposed near and spaced a distance from an upper end 172 of the filter plate 166 (only one of the upper openings 170 being designated by a reference numeral in FIGS. 7 and 9). The filter plate 166 also contains a series of lower openings 174 disposed near and spaced a distance from a lower end 176 of the filter plate 166. Only one of the lower openings 174 is designated with the reference numeral in FIGS. 6 and 8.

The filter plate 166 also contains a series of central openings 178 disposed in the filter plate 166 generally midway between the upper and the lower ends 172 and 176. The central openings 178 are disposed and positioned to be about the center of the liquid level within the tank 138, the liquid level of the fluid disposed in the tank 138 generally between the filter plate 166 and the inlet end 140 of the tank 138.

Upper ends 180 and 182 respectively of the baffles 152 and 154 are disposed in a plane about coplanar with the overflow level 164. Lower ends 180 and 184 of the baffles 152 and 154 respectively are disposed in a plane about coplanar with the inlet end 162 of the plate pipe 160 and the lower end 150 of the inlet pipe 148.

A discharge pipe 188 is connected to the outlet end 142 of the tank 138. The discharge pipe 188 extends through the inlet end 140 and extends a distance downwardly into the tank 138 terminating with an inlet end 190. The inlet end 190 is disposed in a plane about coplanar with the inlet end 162 of the plate pipe 160 and the lower ends 184 and 186 of the baffles 152 and 154. The discharge pipe 188 has an outlet end 192. The outlet end 192 is disposed in a plane about coplanar with the outlet end of the plate pipe 160 and the overflow level 164. When the liquid level within the discharge reservoir 158 reaches or exceeds the overflow level 164, fluid is discharge from the tank 138 via the outlet end 192 of the discharge pipe 188.

A dispenser 194 is connected to the tank 138 and disposed generally near the inlet end 140 of the tank 138. The dispenser 194 is adapted to retain and contain a predetermined amount of a biological activator. The dispenser 194 is constructed and adapted to dispense a predetermined amount at a predetermined rate of the biological activator into the tank 138 generally near the inlet end 140 thereof. The biological activator dispensed via the dispenser 194 is adapted to facilitate the liquification of grease within the fluid in the tank 138. In one embodiment, a biological activator suitable for use with the dispenser 194 is commercially available from Humphrey Marine Sewage Systems, Inc. of California and sold as their Activator No. 10.

In operation, grey water is discharged into the tank 138 (grey water digester 62) via the inlet pipe 148. The baffles 152 and 154 function to facilitate the movement of solids generally toward the lower end 146 or generally toward the upper end 144 of the tank 138 thereby cooperating to maintain a central portion of the grey water within the tank 138 relatively free of solids or grease. The upper and the lower openings 170 and 174 in the filter plate 166 pass grey water from the area between the filter plate 166 and the inlet end 140 of the tank 138 while functioning to filter grease or solids therefrom The grey water filtered of grease and solids is passed into the initial reservoir 168. A central portion of the liquid of the tank 138 generally between the filter plate 166 and the inlet end 140 of the tank 138 passes through the central openings 178 of the filter plate 166 and this liquid is substantially free of grease and solids. This liquid being passed into the initial reservoir 168.

When the liquid level in the discharge reservoir 158 reaches or exceeds the overflow level 164, fluid is passed through the discharge pipe 188 and outputted from the tank 138 as the grey water stream. The outputted grey water stream is substantially free of grease and some solids have been removed from the grey water stream and digested in the grey water digester 62.

A U-shaped air tube 196 is disposed in the tank 138 and positioned generally near the lower end 146. The air tube 198 has a plurality of openings 198 (only one of the openings 198 being designated with the specific reference numeral in FIG. 10). The air tube 196 is connected to the pressurized air source 63 for passing pressurized air into the tank 138 to facilitate the aerobic digestion of solids within the tank 138.

A sanitation system constructed and operated like the sanitation system 10 described herein was constructed and installed on a home having two low flush volume toilets. The house had normal appliances (garbage disposal, clothes washer, dishwasher and the like). In this model, the black water treatment digesters 18 and 22 each had a capacity of about 10 gallons (this being the volume of liquid normally in the digesters 18 and 22). The combined digester 28 had a capacity of about 75 gallons (this being the volume of liquid normally in the combined digester 28). The second combined digester 34 had a capacity of about 75 gallons (this being volume of liquid normally in the second combined digester 34). The pump 128 was operated to pump about 5000 gallons per day from the second combined digester 34, the pump 128 having a pumping capacity of about 25 gallons per minute. The holding tank 40 had a capacity of about 50–100 gallons. Samples were taken at various positions in this sanitation system 10 just described and analyzed. The results of these tests are summarized in Table I below with the suspended solids being expressed in terms of milligrams per liter (mg/l).

TABLE I

DIGESTER SOLIDS REDUCTION VALUES

FIRST BLACK WATER TREATMENT DIGESTER 18

|  | Inlet to First Black Water Treatment Digester 18 | Outlet of First Black Water Treatment Digester 18 |
|---|---|---|
| Time A | 13,800 mg/l | 990 mg/l |
| Time B | 9,600 mg/l | 260 mg/l |
| Time C | 2,500 mg/l | 280 mg/l |
| Time D | 2,500 mg/l | 160 mg/l |

SECOND BLACK WATER TREATMENT DIGESTER 22

|  | Inlet to Second Black Water Treatment Digester 22 | Outlet of Second Black Water Treatment Digester 22 |
|---|---|---|
| Time A | 9,900 mg/l | 550 mg/l |
| Time B | 3,100 mg/l | 160 mg/l |
| Time C | 7,000 mg/l | 240 mg/l |
| Time D | 3,800 mg/l | 200 mg/l |

COMBINED DIGESTER 28

|  | Inlet to Combined Digester 28 | Outlet of Combined Digester 28 |
|---|---|---|
| Time A | 3,150 mg/l | no count taken |
| Time B | 13,600 mg/l | 11,000 mg/l |
| Time C | 2,400 mg/l | 140 mg/l |
| Time D | 500 mg/l | 140 mg/l |

SECOND COMBINED DIGESTER 34

|  | Inlet to Second Combined Digester 34 | Outlet of Second Combined Digester 34 |
|---|---|---|
| Time A | 17,600 mg/l | 60 mg/l |
| Time B | 8,700 mg/l | 80 mg/l |
| Time C | 80 mg/l | 70 mg/l |
| Time D | 90 mg/l | 80 mg/l |

FILTER 38 DISCHARGE

| Time A | 60 mg/l |
|---|---|
| Time B | 80 mg/l |
| Time C | 60 mg/l |
| Time D | 60 mg/l |

The sanitation system 10 provides a system capable of handle black water and grey water in a single system in a manner in which the outputted reconditioned water stream has significantly low solid per liter values. More particular, the present system is designed to provide an outputted reconditioned water stream having solid per liter values below 100 mg/l. The use of separate digesters 18 and 22, a digester for each of the black water sources or toilets and a separate digester 62 for the grey water sources containing solids and grease provides a treatment system which significantly is more efficient. The use of separate digesters for different types of waste (grease, garbage or fecal material and urine) allows for selective growth of specialized bacteria, that is those bacteria which act on fat and plant materials at neutral pH values and those which break down fecal materials at alkaline pH values. Further, the use of separate digesters increases the efficiency of bacterial action which results in a decrease in the size of the tanks or digesters and other system components which results in savings of water and dollars.

In one preferred embodiment, each of the digesters 18, 22, 28, 34 and 62 has an air tube and the system is designed to feed the pressurized air to each of the digesters for a predetermined period of time periodically. For example, in one system, the pressurized air was feed to each of the digesters 18, 22, 28, 34 and 62 for about 15 minutes during each two hour period of time in one application. This timing has been found to assist the bacterial action in the digester. In this instance the air is controlled by an automatic timer (not shown).

It should be noted that although the sanitation system 10 of the present invention has been shown herein and described as an aerobically digesting solids within the various digesters 18, 22, 28, 34 and 62, the system also would be useful in anaerobic digestion type of application thereby eliminating the necessity of the pressurized air source 63 and the various air tubes within the digesters 18, 22, 28, 34 and 62.

Figure 10:
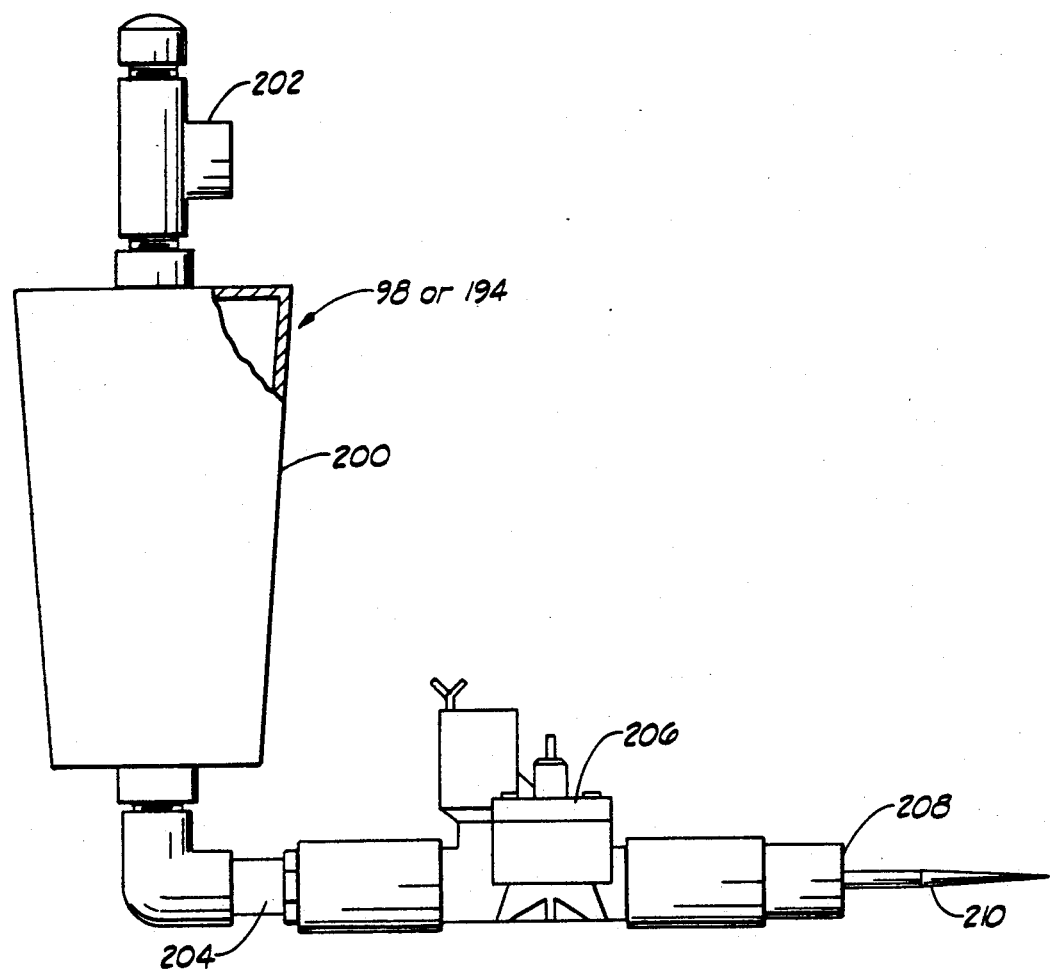
FIG. 10 is a side elevational view of a typical dispenser.

Shown in FIG. 10 is a typical dispenser which may be utilized for the dispensers 98 or 194. The dispenser 98 or 194 comprises a container 200 which is adapted to receive and retain a predetermined amount of biological activator. A vent 202 is connected to the top of the container 200 and functions to vent the particular digester to which the dispenser 198 or 194 is connected. A discharge conduit 204 is connected to a lower end of the container 200 and the biological activator within the container 200 flows out from the container 200 via gravity through the discharge pipe 204. A solenoid valve 206 is interposed in the discharge conduit 204. In the open position of the valve 206, biological activator is passed through the discharge conduit 204 and out a discharge end 208 thereof. In the closed position of the valve 206, biological activator is prevented from being passed through the discharge conduit 204.

A tapered tube 210 is connected to the discharge end 208 of the discharge conduit 204. The tapered tube has an opening extending therethrough which is sized to drip a predetermined amount of biological activator through the tapered tube 210 and into the respective digester. In one preferred embodiment, the tapered tube 210 was sized to drip about 4 ounces of biological activator two or three times a week into the digester. The particular amount of biological activator which is discharged into the digester in a particular application depends upon the parameters of a particular application.

It is common for kitchens in restaurants to be connected to a sewer line and for such kitchens to discharge grey water containing solids and grease into the sewer line. The grease discharge via such grey water sources tends to clog the pumps in pumping stations causing various problems.

Figure 11:
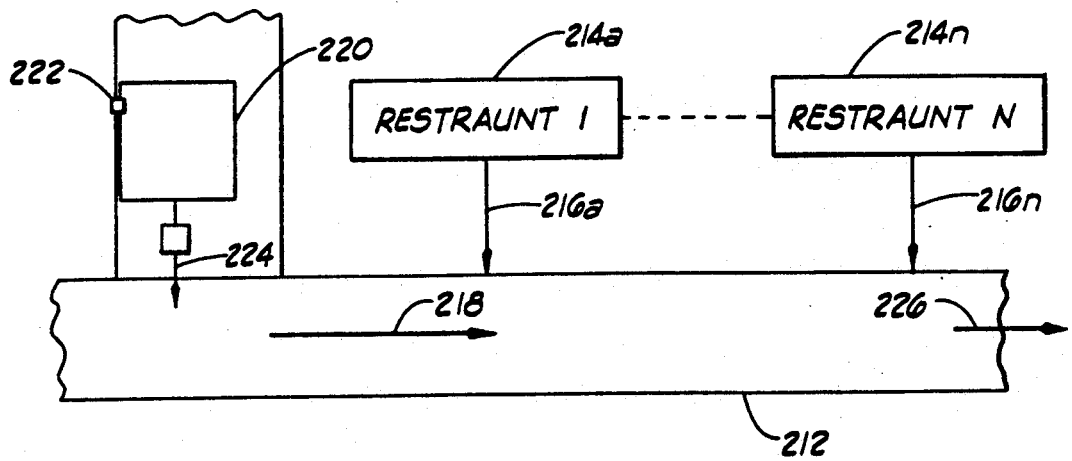
FIG. 11 is a schematic view showing a sewer line with a plurality of grey water sources (restaurants labeled Restaurant 1 through Restaurant N) passing grey water into the sewer line and a dispenser for dispensing an activator for liquefying grease in the grey water connected to the sewer line upstream of the grey water sources.

Diagrammatically shown in FIG. 11 is a sewer line 212 associated with one or more grey water sources 214. The grey water sources 214 in this particular application, more particularly, are restaurant kitchens and these sources are designated in FIG. 11 via the respective designations Restaurant (1) and Restaurant (N) to designate one or more restaurants, the grey water sources being designated by the respective reference numerals 214a and 214n in FIG. 11.

Each of the grey water sources 214a through 214n passes a stream of grey water containing grease into the sewer line 214 the respective grey water streams being designated in FIG. 11 by the reference numerals 216a and 216n. The sewer line stream indicated by the directional arrow in FIG. 11 and the reference numeral 218 contains the grey water streams 216 including the grease therefrom under normal operating conditions and absent the present invention.

The present invention contemplates a dispenser 220 which is connected to the sewer line 212 generally upstream from the grey water sources 214. The dispenser 220 is mounted in the conduit leading from a manhole to the sewer line 212 as indicated diagrammatically in FIG. 11 with the dispenser 220 being connected to the sewer line 212 via fasteners 222 which may comprise a plurality of bolts or other such fastening means. The dispenser 222 is adapted to pass an effective amount of an activator capable of liquefying a substantial portion of the grease into the sewer line. The activator stream is indicated in FIG. 11 by the directional arrow 224. The activator passed into the sewer line 212 contacts the grease in the sewer line 212 and operates to liquify a substantial portion of the grease in the sewer line 212 to produce an outputted sewer line stream 226 which is substantially free of unliquified grease. The dispenser 220 more particularly is adapted to pass an effective amount of the activator at predetermined time intervals into the sewer line 212.

Figure 12:
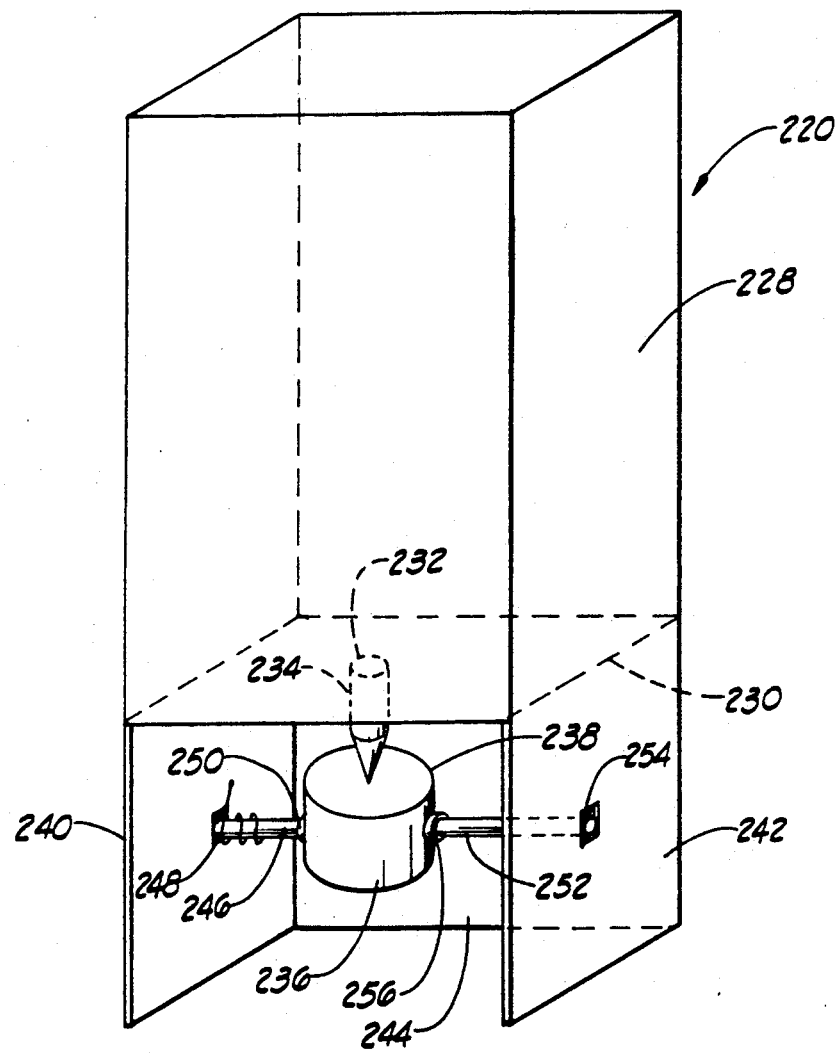
FIG. 12 is a partial isometric view of the dispenser shown in FIG. 11.
Figure 13:
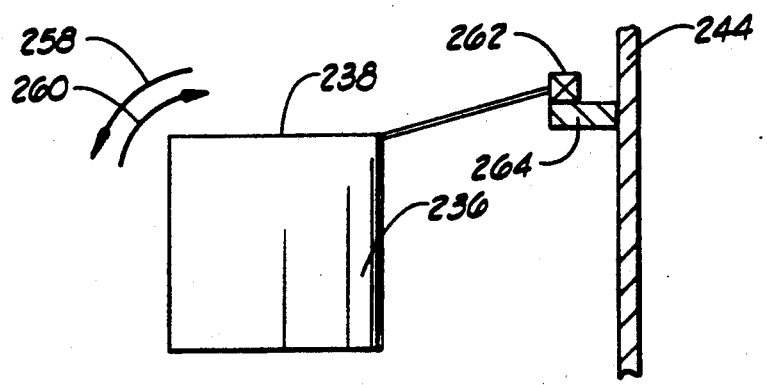
FIG. 13 is a side elevational, partial sectional view showing a portion of the dispenser and showing the cup of the dispenser in a filling position.

One embodiment of a dispenser 220 is shown in FIGS. 12 and 13. The dispenser 220 comprises a container 228 sized and adapted to receive and contain a predetermined amount of the activator. The container 228 has a lower end 230 and an opening 232 is formed through the lower end 230. One end of a tapered tube 234 is connected to the lower end 230 and disposed generally about the opening 232. The activator within the container 228 is passed or discharged through the tube 234. The tube 234 has an opening therethrough sized to drip a predetermined amount of activator at a predetermined rate through the tapered tube 234.

A cup 236 is movably connected to the container 228. The cup 236 is sized and shaped to receive activator through an open upper end 238 thereof. The container 228 includes a pair of side flanges 240 and 242 and a back flange 244. A first shaft 246 is generally connected to the side flange 240 via a bearing 248. The opposite end of a first shaft 246 is generally connected to the cup 236 via a bearing 250.

One end of a second shaft 252 is connected to the side flange 242 via a bearing 254. The opposite end of the second shaft 252 generally connected to the cup 236 via a bearing 256.

The cup 236 is generally supported between the flanges 240 and 242 for pivotal movement in one direction 258 (FIG. 13) from a filling position shown in FIGS. 12 and 13 to a dispensing position wherein the cup 238 is tilted to dispense the activator disposed therein therefrom.

A spring 258 is connected to the first shaft 246 and to the side flange 240. As the cup 236 is pivotally tilted in the direction 258, the spring 258 is wound about the first shaft 246 and provides a torsional bias biasing the cup 236 from the dispensing position in a direction 260 back toward the filling position.

A counter weight 262 (FIG. 13) is connected to the cup 236. The counter weight 262 tends to bias the cup 236 toward the filling position. A stop 264 (FIG. 13) is connected to the back flange 244 and positioned to engage the counter weight 262 to terminate the movement of the cup 236 in the direction 260 thereby cooperating to position the cup 236 in the filling position.

In one particular application, the dispenser 220 was adapted to dispense an activator commercially available from Humphrey Marine Sewage Treatment Systems, Inc. of California and commercially available under its designation biological Activator No. 9 at a rate of about 4 ounces every 6 hours or about 1 gallon per day. The container 228 was sized to hold about 14 or 15 gallons of the biological activator.

Changes may be made in the construction and the operation of the various components, elements and assemblies described herein and changes may be made in the steps or sequence of steps of the methods described herein without departing from the spirit and scope of the invention as defined in the following claims.

What is claimed is:

1. A sanitation system for use with two toilets each discharging a black water stream and a grey water source such as a dishwasher, kitchen sink, garbage disposal, shower or lavatory, discharging a grey water stream, comprising:

two black water treatment digesters means, each black water treatment digester means comprising means for receiving the black water stream discharged from one of the toilets, each black water treatment digester means removing a substantial portion of the solids from the received black water stream and treating the solids removed from the received black water stream via digestion and discharging a treated black water stream having a substantial portion of the solids removed therefrom; and combined digester means for receiving the treated black water stream from each of the black water treatment digesters means and receiving the grey water stream and removing solids from the received grey water stream and the received treated black water streams, digesting the solids removed from the received grey water stream and the received treated black water streams and discharging a combined black and grey water stream, the treated combined black and grey water stream being outputted as an outputted reconditioned water stream.

2. The sanitation system of claim 1 further comprising:

second combined digester means for receiving the treated combined black and grey water stream, removing solids from the treated combined black and grey water stream, digesting the solids removed from the treated combined black and grey water stream and discharging a treated output stream, the treated output stream being outputted as the outputted reconditioned water stream.

3. The sanitation system of claim 2 wherein the second combined digester further comprising:

means for pumping the treated output stream from the second combined digester when the liquid level in the second combined digester reaches a predetermined high level in the second combined digester.

4. The sanitation system of claim 2 further comprising:

holding tank means for receiving the treated output stream from the second combined digester means and being adapted to hold predetermined amounts of the treated output stream; and means for pumping the treated output stream from the holding tank means at predetermined periodic time intervals, the pumped treated output stream from the holding tank means comprising the output recondition water stream.

5. The sanitation system of claim 2 further comprising:

pressurized air source means for outputting air at an elevated pressure level;

means for inputting the pressurized air into the black water treatment digester;

means for inputting the pressurized air into the combined digester; and means for inputting the pressurized air into the second combined digester.

6. The sanitation system of claim 1 wherein the grey water source comprises a first grey water source outputting a first grey water stream having solids and/or grease therein and a second grey water source outputting a second grey water stream having substantially no solids and substantially no grease therein, and wherein the sanitation system further comprises:

grey water digester means for receiving the first grey water stream, removing a substantial portion of the solids and grease therefrom and outputting a grey water stream having substantially no grease and substantially no solids therein, the grey water stream outputted from grey water digester and the second grey water stream being inputted into the combined digester means as the grey water stream.

7. The sanitation system of claim 6 further comprising:

pressurized air source means for outputting air at an elevated pressure level;

means for inputting the pressurized air into the black water treatment digester;

means for inputting the pressurized air into the combined digester;

means for inputting the pressurized air into the grey water digester.

8. The sanitation system of claim 6 further comprising:

means for passing an activator into the grey water digester for liquefying the grease in the grey water digester.

9. The sanitation system of claim 1 further comprising:

pressurized air source means for outputting air at an elevated pressure level;

means for inputting the pressurized air into the black water treatment digester; and means for inputting the pressurized air into the combined digester.

10. A method wherein a black stream is discharged from each of at least two toilets and wherein a grey water stream is discharged from a grey water source such as a dishwasher, kitchen sink, garbage disposal, shower, lavatory, comprising:

inputting each black water stream into a black water treatment digester, removing a substantial portion of the solids from the received black water stream in each black water treatment digester and treating the solids at each black water treatment digester removed from the black water stream via digestion and discharging from each of the black water treatment digesters a treated black water stream having a substantial portion of the solids removed therefrom; and inputting the treated black water streams into a combined digester and inputting the grey water stream into the combined digester, and removing solids from the inputted treated black water streams and from the inputted grey water stream, digesting in the combined digester the removed solids and discharging a treated combined black and grey water stream, the treated combined black and grey water stream being outputted as an outputted reconditioned water stream.

11. The method of claim 10 further comprising:

inputting the treated combined black and grey water stream into a second combined digester, removing a substantial portion of the solids from the treated combined black and grey water stream and digesting the solids removed from the treated combined black and grey water stream in the second combined digester and outputting a treated output stream from the second combined digester, the treated output stream comprising the outputted reconditioned water stream.

12. The method of claim 10 further comprising:

inputting the treated combined black and grey water stream into a second combined digester, removing a substantial portion of the solids from the treated combined black and grey water stream and digesting the solids removed from the treated combined black and grey water stream and the second combined digester to produce a treated output stream;

pumping the treated output stream from the second combined digester when the liquids in the second combined digester reaches a predetermined high level in the second combined digester.

13. The method of claim 12 further comprising:

inputting the treated output stream into a holding tank; and pumping at periodic time intervals the treated output stream from the holding tank, the treated output stream pump from the holding tank comprising the outputted reconditioned water stream.

14. The method of claim 12 further comprising:

passing pressurized air into the black water treatment digester, the combined digester and the second combined digester for assisting in aerobically treating solids in the black water treatment digester, the combined digester and the second combined digester.

15. The method of claim 10 wherein the grey water source comprises a first grey water source comprising a dishwasher, a kitchen sink or a garbage disposal, outputting a first grey water stream having solids and grease therein and a second grey water source outputting a second grey water stream having substantially no grease and substantially no solids therein, and wherein the method further comprises:

inputting the first grey water stream into a grey water digester, removing a substantial portion of the solids and the grease from the first grey water stream and outputting a grey water stream having a substantial portion of the grease and a substantial portion of the solids removed therefrom, the grey water stream outputted from the grey water digester and the second grey water stream comprising the grey water stream inputted into the combined digester.

16. The method of claim 15 further comprising:

passing pressurized air into the black water treatment digester, the combined digester and the grey water digester for assisting in aerobically treating solids in the black water treatment digester, the combined digester and the grey water digester.

17. The method of claim 15 further comprising:

passing an activator into the grey water digester for liquefying a substantial portion of the grease in the grey water and the grey water digester.

18. The method of claim 10 further comprising:

passing pressurized air into the black water treatment digester and into the combined digester for assisting in aerobically digesting the solids in the black water treatment digester and the combined digester.

19. The method of claim 10 wherein the solids level in the outputted reconditioned water stream is below about 100 mg/l.

* * * * *

UNITED STATES PATENT AND TRADEMARK OFFICE
CERTIFICATE OF CORRECTION

PATENT NO. : 5,114,586

DATED : May 19, 1992

INVENTOR(S) : Frank Humphrey

It is certified that error appears in the above-identified patent and that said Letters Patent is hereby corrected as shown below:

Drawing Figure 11, delete the word "Restraunt" and substitute therefore the word --Restaurant-- both occurrences.

Column 1, line 8, delete the word "past" and substitute therefore the word --passed--.

Column 2, line 20, the numeral --22.-- should be added after the word, digester.

Column 3, line 2, delete the word "pas" and substitute therefore the word --pass--.

Column 4, line 40, delete the word "An" and substitute therefore the word --A--.

Column 5, line 65, delete the word "a" and substitute therefore the word --an--.

UNITED STATES PATENT AND TRADEMARK OFFICE
CERTIFICATE OF CORRECTION

PATENT NO. : 5,114,586

DATED : May 19, 1992

INVENTOR(S) : Frank Humphrey

It is certified that error appears in the above-identified patent and that said Letters Patent is hereby corrected as shown below:

Column 6, line 16, delete the word "pass" and substitute therefore the word --passed--.

Column 7, line 67, delete the word "charge" and substitute therefore the word --charged--.

Column 8, line 60, the word --the-- should be inserted between the words, being, and, volume.

Column 9, line 43, delete the word "handle" and substitute therefore the word --handling--.

Column 9, line 46, delete the word "particular" and substitute therefore the word --particularly--.

Column 9, line 67, delete the word "feed" and substitute therefore the word --fed--.

Column 13, line 46, the word --water-- should be inserted between the words, black, and, stream.

Signed and Sealed this

Fifth Day of October, 1993

BRUCE LEHMAN

*Attest:*

*Attesting Officer*  *Commissioner of Patents and Trademarks*